United States Patent Office 3,500,057
Patented Mar. 10, 1970

3,500,057
DIRECT CURRENT POWER TRANSMISSION BETWEEN A NUMBER OF CONVERTER STATIONS
Hans A. Stackegård, Ludvika, Sweden, assignor to Allmänna Svenska Elektriska Aktiebolaget, Vasteras, Sweden, a Swedish corporation
Continuation of application Ser. No. 388,188, Aug. 7, 1964. This application Nov. 22, 1968, Ser. No. 778,349
Claims priority, application Sweden, Aug. 15, 1963, 8,919/63; Oct. 25, 1963, 11,734/63; Jan. 8, 1964, 146/64
Int. Cl. H02j 1/00
U.S. Cl. 307—82                                    4 Claims

ABSTRACT OF THE DISCLOSURE

A high-voltage direct-current power transmission system for connection of at least three A.C. networks; each A.C. network is connected to the D.C. system over a converter station with a number of converters which are series-connected on their D.C. sides, and the number of series-connected converters is not the same in all stations. Stations with the same number of series-connected converters are connected to a common D.C. line in parallel to each other and two stations with different nuber of series-connected converters are connected to each other by taps on the station with the higher number of converters so that the station with the lower number of converters over its D.C. line is connected in parallel to a part of the station with the higher number of converters.

---

Figure 1:
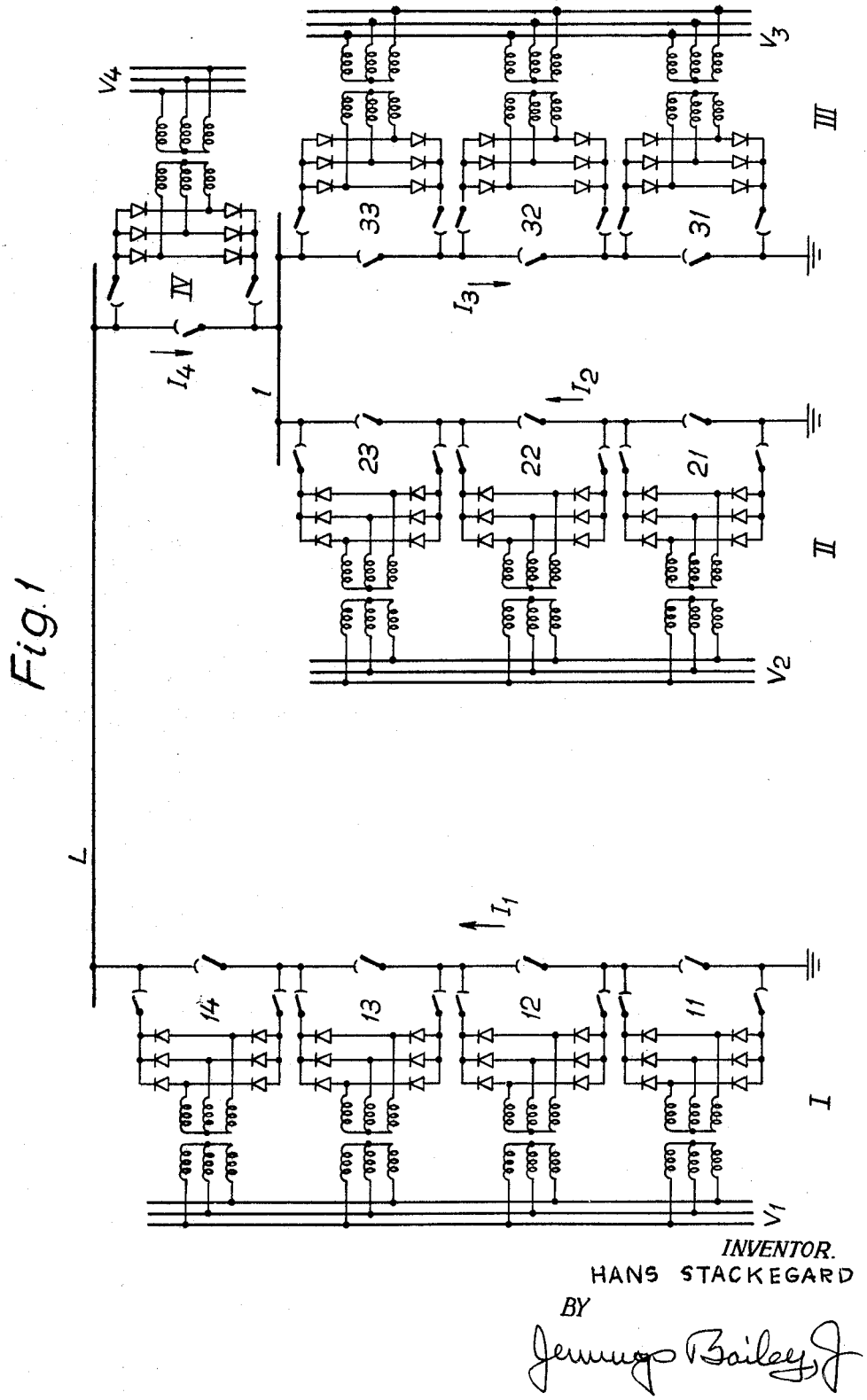

This application is a continuation of application No. 388,188 filed Aug. 7, 1964, now abandoned.

The present invention relates to a power transmission with high voltage direct current for connecting together several alternating current networks, which transmission comprises at least three converter stations, each comprising a number of constituent converters.

Power transmissions with high voltage direct current between two stations are now generally known and a number of these have already been completed or are under construction. A deciding factor for the economy of such a direct current transmission compared with an alternating current transmission is the distance between the two end stations and the transmitted power. In direct current transmission between more than two points the question of economy in comparison with an alternating current transmission will immediately be more complicated, and at the same time as the control of such a plant demands greater preliminary calculations and more complex control equipment. Recently however these problems have also been solved and proposals for such power transmissions and control equipment for these have been published. Such plants could be characterized either by series connection or by parallel connection of the different converter stations, parallel connection of the converter stations requiring that the different converter stations are connected in parallel between two direct current conductors. This means that converter stations of different categories, rectifier stations and inverter stations are reverse parallel connected.

Regarding the parallel connection of converter stations this is rather expensive in those cases where the distance between some of the stations is small or where one of the stations is situated in the vicinity of a longer transmission line and connected as a tap from it. In parallel connection of converter stations the same voltage must be present on all stations, which means that all stations must be equipped with the same number of constituent converters. Each station must thus have a complete supply of constituent converters irrespective of the rated power of the station and in those cases where a relatively small station is placed near other converter stations or near an existing longer transmission line the station must then have the same equipment as all other stations without having the advantage of the gain which the cheaper direct current conduit represents in relation to an alternating current transmission at greater distances.

A cheaper solution may be effected by series connecting all the converter stations in the transmission, whereby the number of constituent converters in the different stations may be favourably chosen. Since in this case the current is the same in all converter stations a power regulation must be made in the different stations with the help of voltage regulation in the stations, which gives a rather limited regulation range, and therefore with this solution the relation between the power of the stations will be restricted within rather limited regulating possibilities.

The present invention gives a combination of said two solutions, in other words a combination of series and parallel connection, whereby the same good regulating possibilities are obtained as with the parallel connection while at the same time stations for smaller power may be constructed with a lesser number of constituent converters than in a series connection. A plant according to the invention is characterised in that each converter station is provided with a number of constituent converters in relation to the rated power of the station and that converter stations with equal numbers of constituent converters are connected in parallel and that a group of stations with a smaller number of constituent converters is connected in series with the necessary number of extra constituent converters and thereafter parallel connected with a group of stations with a greater number of constituent converters. Since the number of constituent converters in a station is relatively small—at present hardly exceeding 10 constituent converters—the connection of the stations with different numbers of constituent converters should be made with such a number of extra constituent converters that the same number of constituent converters is always connected in parallel. With such a small number of constituent converters in the stations, parallel operation of stations whose constituent converter number shows a difference of only one would demand unreasonably large regulation ranges in the converter transformers.

Said extra constituent converters are suitably located in one of the stations, so that this station will have the same total number of constituent converters as the staions with the greater number and may be connected parallelly with these, while a part of the station will be regarded as a station with a lower number of constituent converters.

A case where a transmission according to the invention would be convenient is for example transmission over a longer distance from a remote power source to a number of consumption points each with its converter station within a limited range. In such a case both the end stations for the longer transmission line should according to the invention be equipped with such a number of constituent converters that a direct voltage suitably high for the long transmission is attained, while within the receiver range some of the converter stations may be made with a lesser number of constituent converters. In this way there is obtained on the one hand a saving of the number of constituent converters in some of the receiver stations and on the other hand the shorter branch conduits, the power of each of which is less than that of the main line, can be made for lower voltage. In addition to a lower insulation level on the branch lines the lower voltage is advantageous from a radio disturbance viewpoint.

Figure 2:
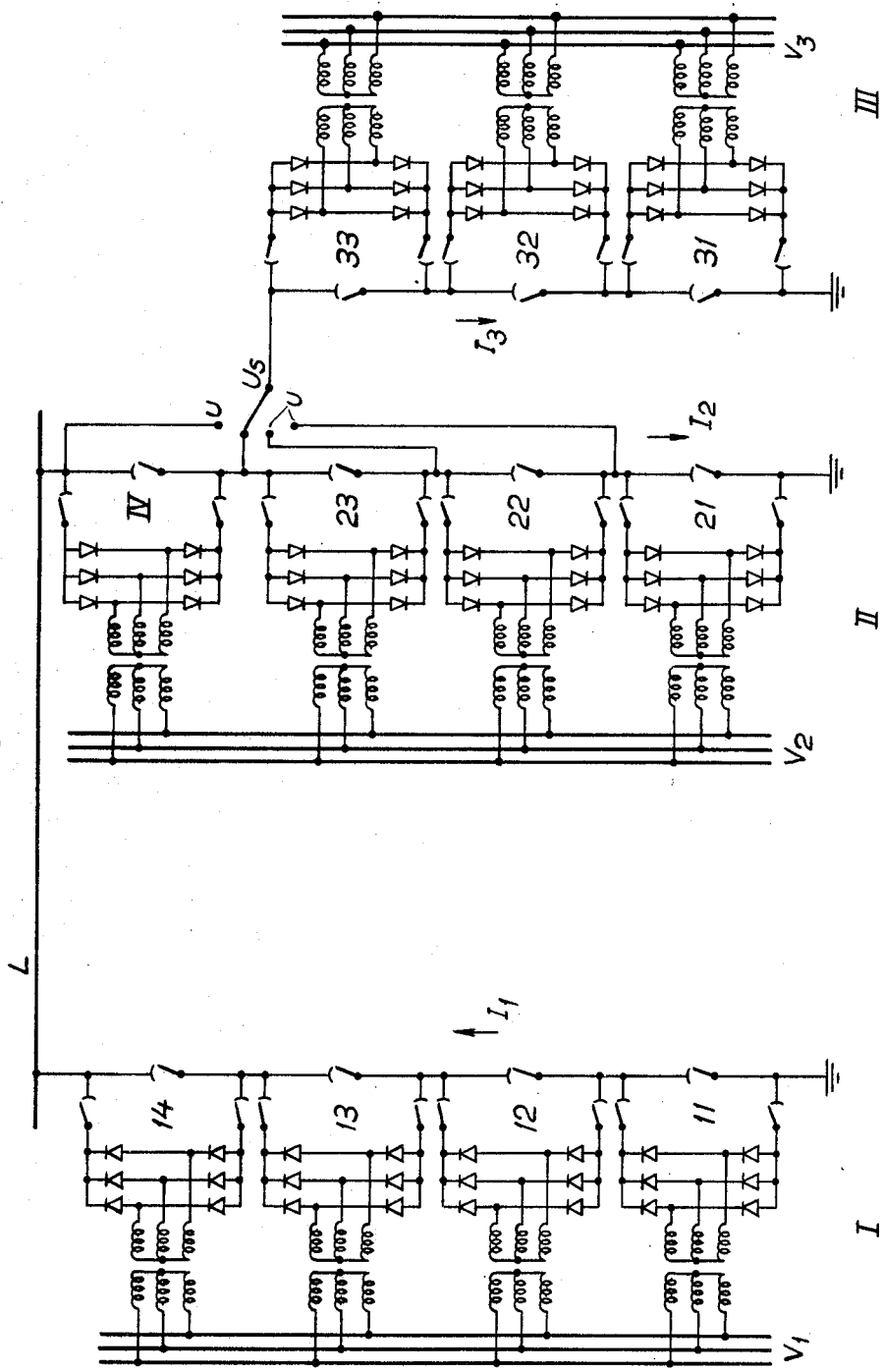
Figure 3:
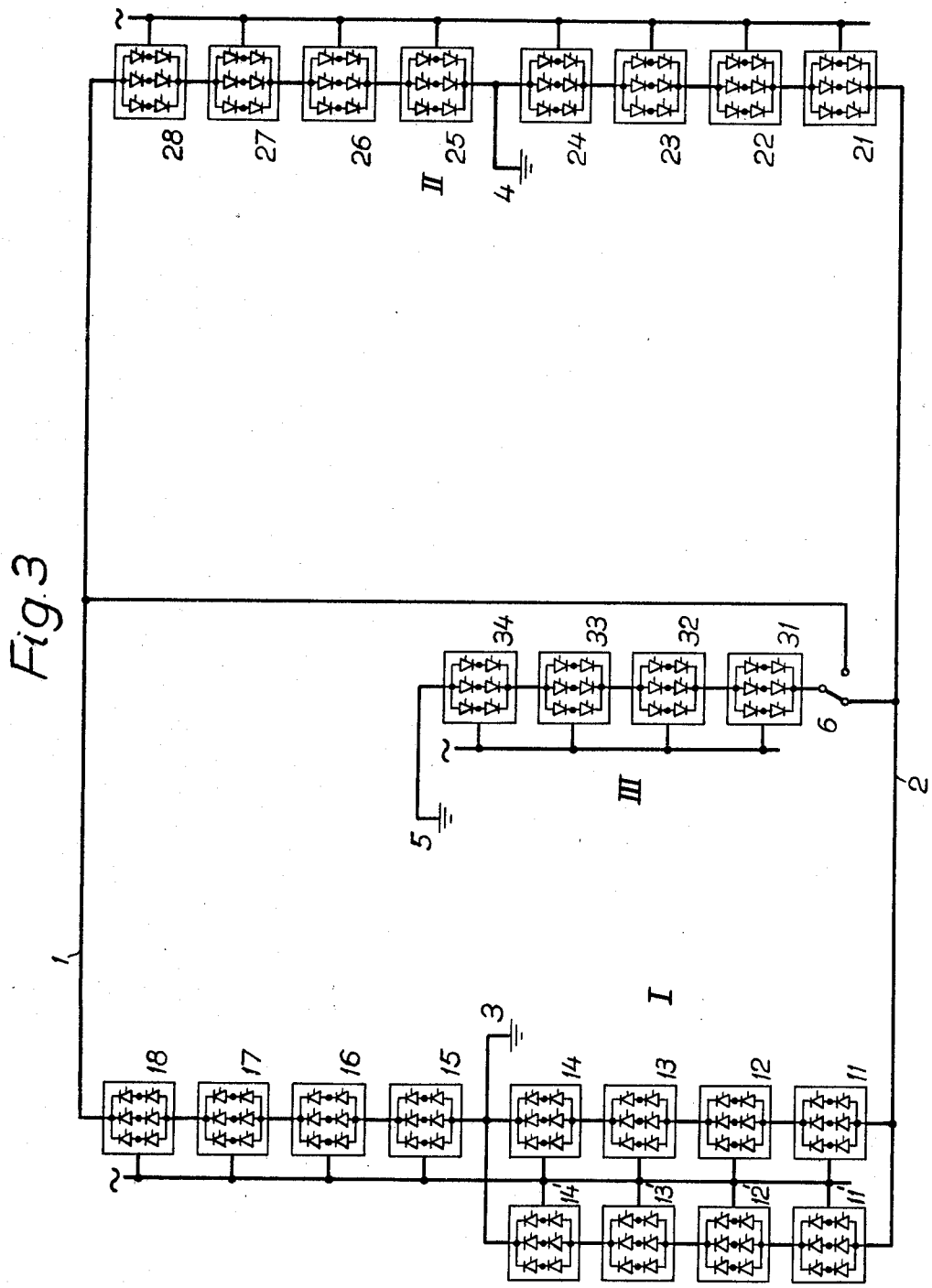

The invention will be otherwise described with reference to the accompanying drawing, where FIGURES 1 and 2 show two examples of insertions in monopolar shape according to the invention. FIGURE 3 shows a transmission according to the invention in combined mono- and bi-polar shape.

FIGURE 1 shows three converter stations I–III divided into two groups, where one of the groups consists of the station I with four constituent converters 11–14 while the other group comprises the stations II and III each with three constituent converters 21–23 and 31–33. Within each station the constituent converters are in a conventional way connected in parallel on the alternating current side to the alternating current network $V_1$–$V_3$ and on the direct current side connected in series between earth and a transmission line. The stations II and III are connected in parallel to a line 1 with lower voltage and in series with a constituent converter IV connected to another direct current line L with higher voltage to which the station I is also connected. The arrangement can be developed in a favourable way with an arbitrary number of converter stations with an arbitrary number of constituent converters, a number of constituent converters in one station being always connected in parallel with the same number of constituent converters in another station.

As an example a remote power source has been mentioned which was intended to supply a number of consumption points within a limited range, which in the present case would mean that, as the drawing shows, a rectifier station I connected to a power source, from which direct current power is transmitted through the line L and earth to two inverter stations II and III arranged relatively near each other. Other possible cases are however feasible, but these different cases are not further illustrated individually.

As the simplest operation, one can imagine that the station I operates as a rectifier while the stations II and III operate as inverters. Analogous to this is the case where the station I is an inverter and the stations II and III operate as rectifiers, in other words that the station I represents one category and the stations II and III represent another category. The simplified cases are not show in the drawings. The constituent converter IV must work in the same way as the stations II and III as the converter IV is series connected with the stations II and III and together with these forms a group with the same number of series connected converters as the first group comprising station I. The direct current of the converter IV is then divided between the stations II and III in a suitable way.

Upon a fault in a constituent converter in a station this will usually be bypass connected and disconnected by means of switches and in a conventional transmission with parallel-connected stations one must thereby either disconnect the whole station or decrease the voltage of the whole transmission. In a transmission according to the invention the following possibilities are feasible. By-pass connection of a constituent converter in the station I can be relieved most suitably by bypass connecting the constituent converter IV, whereby the voltage in the line L is decreased to the same level as the voltage in the line 1 and the transmission works as a conventional parallel connection of converter stations. Faults in the constituent converter IV are remedied in a similar way by bypass connecting this and a constituent converter in station I whereby the same operation is obtained as mentioned above. Upon faults in a constituent converter in the station II one can either completely disconnect this station or bypass connect a constituent converter in each of the stations I and III, whereby the voltage is lowered in both the lines L and 1. Faults in constituent converters in the station II are remedied in a similar way.

In the above example the operation conditions have been dealt with when station I represents one category while the stations II and III represent another category of converter. If one imagines that the stations I and II belong to one category (as indicated by arrows $I_1$, $I_2$ and $I_3$ in FIGURE 1) and station III another category, the constituent converter IV and one of the constituent converters in station I may be bypass connected, whereby the line L has the same voltage as the line 1. Another possibility in this case is to allow the constituent converter IV to operate in the same way as the station III, whereby this constituent converter together with the station III (see arrow $I_4$) forms a category of converter while the stations I and II work together and form another category of converter. The same operating conditions occur when the stations I and III form one category and the station II another. The current in the constituent converter IV is in both cases the same as the current in station I.

The constituent converter IV may as indicated on FIGURE 1 be arranged as a separate, series connected converter station with its own alternating current network $V_4$. This is however a rather theoretical combination which is only of interest for special cases.

Instead the constituent converter IV may be located in one of the other stations, whereby a transmission is obtained as indicated in FIGURE 2, where the stations I and II each comprise four constituent converters while the station III has three constituent converters. The alternating current network $V_4$ is then the same as the network $V_2$.

The conditions during normal operation are analogous to the conditions according to FIGURE 1. However, it should be taken into consideration that the two parts of the station II may carry different currents, which in certain cases means that the one part works as a rectifier and the other part as an inverter. Such is the case for example when the stations I and II represent one category and the station III another. From a converter technique viewpoint such an operation offers however only traditional problems. Upon faults in constituent converters in the stations II and III however certain advantages are gained. Disconnection of the constituent converter IV must as mentioned earlier correspond to disconnection of a constituent converter in station I and lowering of the voltage on the line L to the same level as the line 1.

Disconnection of one of the lower of the constituent converters in station II may be relieved either by disconnection of corresponding constituent converters in the stations I and III and lowering of the voltage of the whole transmission or by disconnection of the whole of the lower part of the station II. In the last-mentioned case however the constituent converter IV continues to work, and therefore station II is not completely currentless. The station may thus continue to work with the load which the constituent converter IV admits. A third possibility is to disconnect a constituent converter in the station I and connect the line 1 direct to the line L.

Upon faults in a constituent converter in the station III this station may in a conventional way be disconnected or the voltage of the whole trasmission may be decreased by disconnecting corresponding constituent converters in the other stations. A third possibility in this case is to connect the line 1 one step lower down in the station II which for this purpose is provided with terminals U between the different constituent converters and a switch $U_S$. This last solution means that the station III according to the present invention may continue to work with lowered voltage without changing the voltage in the other part of the transmission, which was not the case in a conventional parallel-connection of converter stations.

In accordance with normal practice in HVDC transmissions, all switchings are made in such a way that the system is first made currentless by transferring all converter stations into inverter operation, whereafter the switchings are carried out, whereafter the stations are transferred back to normal operation. In this way all switchings are made in a voltage and currentless system opposite to HVAC systems, where switchings are made at normal voltage.

From the above it is evident that according to the invention on the one hand the advantage is gained that shorter lines and lines with less power together with suitable converter stations may be made for lower voltage and thereby lower costs, on the other hand that by using different voltages in different sections of a transmission greater freedom is obtained in controlling the different converter stations in relation to each other, whereby it is possible without changing the voltage in the other parts of the transmission to maintain the operation in a faulty station which according to the conventional parallel connection principle would either have been disconnected or have given rise to a lowering of the voltage in the whole transmission system.

In FIGURES 1 and 2 only transmissions in so-called monopolar shape have been shown. It is however quite clear that by doubling the circuits shown a power transmission in so-called bipolar shape can be obtained, i.e., with a positive and a negative transmission conductor, in which the earth connections at symmetrical operation are mainly currentless.

FIGURE 3 shows to a further development of such a bipolar transmission which is characterised by two bipolar converter stations with the same number of series-connected constituent converters and connected to both said transmission conduits and in addition a third monopolar station with half the number of constituent converters in relation to the two other stations and connected between one of said transmission conduits and earth. For the sake of simplicity each converter is only symbolized with its rectifier bridge, while the converter transformers shown in FIGURES 1 and 2 are omitted. Further, the A.C. lines are shown single-phased. The third converter station will be considerably cheaper than the two others, and may be connected to the transmission conduit without changing anything essentially in this and the invention is therefore very important in such cases where it is desirable to connect to a power transmission at a place where the power requirement is too small to justify a bipolar converter station. Further it is seen that in a case where this third converter station does not lie quite near to the main direction of the power transmission the station may be connected to the transmission by means of a single transmission conductor and earth return conduction, while a bipolar converter station would require two transmission conductors.

In certain cases it may be suitable to provide the third station with switching means for alternating connection of the station to the one or the other of said transmission conductors. This may for example be suitable if the third station is to be used both as inverter and as rectifier. Further, it may be desirable, with regard to the mixing of mono- and bi-polar transmission, to reinforce the one pole in that one of the other two converter stations which works as rectifier.

When choosing between mono- and bi-polar transmission there are different, partly opposing, considerations to be made. The monopolar transmission with a single transmission conductor is generally cheapest. In contrast the reliability of operation in the bipolar transmission is greater, since upon faults in a transmission conductor this can be disconnected and monopolar operation continues with the help of the other pole and the earth return circuit. Further, the bipolar transmission is advantageous from a tele-technique viewpoint, since the monopolar transmission involves greater tele-disturbances than the bipolar. Power transmission with air conductors for high voltage direction current is above all of interest for long distances, and in the case of a remotely placed power station which is intended to supply by a direct current line two or several converter stations with direct current power, a plant according to the invention can suitably be made in such a way that the power from a rectifier station is carried over a great distance to the monopolar converter station and from there on to the bipolar inverter station. Often the long part of the transmission conductor is carried through deserted countryside or sparsely inhabited areas where tele-disturbances from the monopolar part of the transmission are less important, while the later part of the transmission which is purely bipolar goes through more densely inhabited areas where tele-disturbances cannot be permitted.

FIGURE 3 shows a power transmission according to the invention. The drawing shows three converter stations I, II and III, of which stations I and II contain eight series-connected constituent converters 11–18 and 21–28. The station I is considered to work as a rectifier station and station II as an inverter station and both the stations are connected by means of a positive and a negative transmission conductor (land 2), and each is provided with an earthed centre terminal (3, 4). These stations are thus bipolar and connected with a bipolar transmission. The station III is made as a monopolar station with only four series-connected constituent converters (31–34) and connected between earth (5) and the negative transmission conductor 2. It is seen that the transmission to the left of the station III is a mixture of mono- and bipolar transmission while the transmission to the right of the station II is purely bipolar. This is however under the assumption that the current in the two parts in the station II is the same, so that the current in the earthed centre terminal of the station is zero. In order to obtain a better utilisation of the converters in the station I the lower part of this has been reinforced by connecting in two parallel converter branches, each with four series-connected constituent converters (11–14, 11'–14'). In this way by using the same type of constituent converter everywhere in all three stations fairly even loading is obtained on all constituent converters. Instead of using two parallel branches of converters it is possible to use a greater number of parallel anodes in the constituent converters in the lower part of the station I. If the load on the station III is small it is possible simply to use the same constituent converter in the whole station I and permit a lesser dissymmetry in the load of the two parts of this station.

In certain cases the possibility can be considered of allowing the station III to work alternatively as a rectifier or inverter, for which purpose the station may be provided with switching means which is shown for connection of the station to the one or the other of transmission conductors. In inverter operation the station should be connected to the lower transmission conductor while in rectifier operation the station should be connected to the upper transmission conductor. In the last-mentioned case the station will work in parallel with the upper branch of the station I and in series with the two parallel-connected lower branches of this station.

In any case it is seen that the transmission to the right of the station III can be operated purely bipolarly, and therefore this part of the transmission will be fairly free from disturbance for possible tele-communications, and therefore this part of the transmission may be permitted to run through more densely inhabited areas.

In the station II shown in FIGURE 2 the current will not be equal in the different constituent converters as is otherwise the case in normal converter stations. On the alternating current side of a converter station a number of harmonics will arise, whose number $n$ is determined by the equation $n = k \cdot p \pm 1$, where $p$ is the pulse number and $k$ can assume different values 1, 2, 3, etc. In order to increase the pulse number and thereby decrease the number of harmonics on the alternating current side it is usual in a converter station to phase-displace the different constituent converters in relation to each other by different connection of the separate converter transformers. A condition for being able to decrease in this way the number of harmonics is however that the total power of all constituent converters in one phase position is equal to the total power of the constituent converters in another phase position, which in a converter station with an even number of constituent converters, whose current is the same, is generally easy to effect.

While it is thus relatively simple with conventional converter stations to eliminate the lower harmonics by increasing the pulse number of the station, it was not quite clear how this could be done with a converter station where the currents in the different constituent converters are different. According to a further development of the invention it is proposed in each separate case, by connecting the separate converter transformers, to make sure that the power of the different constituent converters is distributed in such a way that the total power of all constituent converters with one phase position in least at normal operation is as near as possible equal to the total power of all constituent converters with another phase position. Even though it may often be impossible to eliminate completely the lower harmonics it is in any case possible to attain a considerable limiting of the power on these, by means of which the dimensions of the harmonics filters required for the station can be considerably decreased.

It is admitted that the expression as equal as possible normally only involves a pure desire, but it should hereby be considered that with a converter station of the sort described here only a few combinations are possible, and therefore the main thought in this idea quite simply consists of an analysis of an actual converter station.

What is claimed is:

1. A high voltage direct current power transmission system for connection of at least three separate A.C. networks; a static converter station for each A.C. network; each station comprising a plurality of static converters connected on their A.C. sides to the corresponding A.C. network in parallel to each other, and connected on their D.C. sides in series with each other; the number of series-connected converters in some stations being different from the number of series-connected converters in some of the other stations; characterised in that converter stations with the same number of series-connected converters are connected on their D.C. sides to a common D.C. transmission line in parallel to each other; one of the stations with a higher number of series-connected converters being provided on its D.C. side with a connection between its series-connected converters to a station with a lower number of series-connected converters at such a point that the station with the lower number of converters is connected in parallel to a part of the station with the higher number of converters having the same number of converters as the station with the lower number of converters.

2. A high voltage direct current power transmission system as claimed in claim 1, characterised in that said station with the higher number of converters is provided with a number of taps between the different converters; one of said taps forming a part of said connection; said taps making it possible to connect the station with the lower number of converters to different taps in said first mentioned station.

3. A high voltage direct current power transmission system for connection of at least three separate A.C. networks; a static converter station for each A.C. network; each station comprising a plurality of static converters connected on their A.C. sides to the corresponding A.C. network in parallel to each other, and connected on their D.C. sides in series with each other; characterized in that two of said A.C. networks are each connected to a converter station with a positive and a negative end terminal; said two stations having the same number of series-connected converters; the end terminals of said two stations being connected together through a positive and a negative D.C. line; at least one of said stations being provided with an earthed center tap; a third station provided with half the number of series-connected converters; said third station being connected in parallel to one half of said center-tapped stations over one of said D.C. lines and earth.

4. A high voltage direct current power transmission system as claimed in claim 3; characterized in that said third station is provided with switching means for selectively connecting one of its end terminals to one or the other of said D.C. lines.

References Cited

UNITED STATES PATENTS

| | | | |
|---|---|---|---|
| 1,990,759 | 2/1935 | Stone | 321—2 |
| 2,125,115 | 7/1938 | Kuyper | 321—2 |
| 2,224,645 | 12/1940 | Eichberg | 321—2 |
| 2,419,464 | 4/1947 | Schmidt | 321—2 |

ORIS L. RADER, Primary Examiner

W. E. DUNCANSON, JR., Assistant Examiner

U.S. Cl. X.R.

321—2